United States Patent [19]

Arsac et al.

[11] 3,934,974

[45] Jan. 27, 1976

[54] SOLUTION OF ETHYLAURAMINE HYDROCHLORIDE IN THIODIGLYCOL

[75] Inventors: Aimé Joseph Arsac; Roland Jean Dominique Tosan, both of Condrieu, France

[73] Assignee: Produits Chimiques Ugine Kuhlmann, Paris, France

[22] Filed: Sept. 5, 1973

[21] Appl. No.: 394,577

[30] Foreign Application Priority Data

Sept. 5, 1972 France .............................. 72.31355

[52] U.S. Cl. .................................... 8/93; 8/7; 8/79
[51] Int. Cl.² .......................................... D06P 1/68
[58] Field of Search ............................... 8/93, 79, 7

[56] References Cited

UNITED STATES PATENTS

| 3,617,183 | 11/1971 | Grosklos et al. | 8/93 |
| 3,617,185 | 11/1971 | Drautz | 8/93 |

*Primary Examiner*—Donald Levy
*Attorney, Agent, or Firm*—Browne, Beveridge, DeGrandi & Kline

[57] ABSTRACT

Solution of ethylauramine hydrochloride in thiodiglycol; process for the preparation of such a solution in which dry ethylauramine hydrochloride, without water of crystallisation, is dissolved in thiodiglycol and process of colouration in which the colouring agent is such a solution.

2 Claims, No Drawings

SOLUTION OF ETHYLAURAMINE HYDROCHLORIDE IN THIODIGLYCOL

The present invention relates to solutions of ethylauramine hydrochloride in thiodiglycol, to their preparation and to their use.

Ethylauramine is a well known dyestuff which is in fact the hydrochloride of bis-4,4'-(diethylamino)-diphenyl-methyleneamine, the formula of which is as follows:

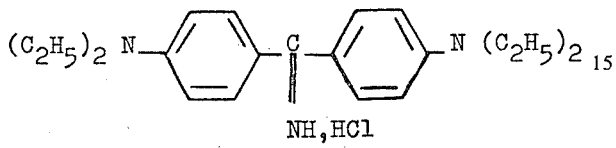

This dyestuff is of increasing importance, especially with regard to the dyeing of paper. Just like its lower homologue ordinary auramine, it has the disadvantage, when it is in powder form, of emitting particularly disagreeable dusts. In order to mitigate this disadvantage consideration has been given to providing this dyestuff in an anti-dust form, but it is difficult to arrive at a perfect result by means of adjuvants. Its presentation in the form of concentrated solutions allows the formation of dusts to be avoided and a volumetric measure of the dyestuff to be effected. However, these solutions must satisfy certain requirements. It is necessary for them to be stable over a period of several months and that crystallisation of the dyestuff should not occur when the temperature falls: it is also necessary that a clear solution of the dyestuff should be obtained on dilution with water.

For this purpose, French Pat. No. 1,595,616 has recommended the use of the following solvents: ethylene glycol, diethylene glycol, monomethyl or monoethyl ethers of ethylene glycol.

It has now been found according to the present invention that these various solvents may advantageously be replaced by thiodiglycol which has the formula:

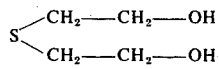

This solvent enables very concentrated solutions of ethylauramine hydrochloride to be obtained, more concentrated than with the other solvents. A concentration of 50 percent by weight of dyestuff can be reached and even exceeded. The solutions are stable for a longer time, and the aqueous dilutions are much clearer, than when the other solvents mentioned above are used. The solutions according to the invention are prepared by using dry ethylauramine hydrochloride not containing water of crystallisation. For example, 15 or more parts by weight of hydrochloride to 85 parts by weight of thiodiglycol may be used. Surface active compounds, preferably cationic or non-ionic, may be added to the solutions obtained with a view to possible improvement of their behaviour.

The solutions of the invention are preferably used for the colouration of paper but they may be used for example for the colouration of textile fibres or printing inks.

The invention is illustrated by the following Examples in which the parts are parts by weight unless the contrary is indicated.

EXAMPLE 1

100 parts of thiodiglycol and 100 parts of dry ethylauramine hydrochloride, without water of crystallisation, are mixed at the ambient temperature. The mixture is heated progressively to a temperature of 60°C. and is maintained at this temperature for two hours until solution is complete. Then 200 parts of a 50 percent solution of dyestuff are obtained which dyes paper a yellow shade similar to that of ordinary auramine. This solution is very stable over a period of several months. If 1 ml of this solution is taken and diluted with 50 ml of water, a perfectly clear yellow solution is obtained.

EXAMPLE 2

200 parts of thiodiglycol are mixed at the ambient temperature with 100 parts of dry ethylauramine hydrochloride, without water of crystallisation, and the mixture is heated progressively to a temperature of 60°C. 300 parts of a solution ready for use are obtained. This solution is very stable over a period of several months and has a lower viscosity that the solution of Example 1.

We claim:

1. Solution of ethylauramine hydrochloride in thiodiglycol wherein the concentration of ethylauramine hydrochloride is equal to, or greater than 15 percent by weight.

2. Process for the preparation of a solution of ethylauramine hydrochloride in which 15 or more parts by weight of dry ethylauramine hydrochloride, without water of crystallisation, is dissolved in 85 parts by weight of thiodiglycol.